United States Patent
Kakeya et al.

(10) Patent No.: US 10,562,996 B2
(45) Date of Patent: Feb. 18, 2020

(54) CURABLE RESIN COMPOSITION, CURED PRODUCT, AND LAMINATE

(71) Applicant: MITSUBISHI GAS CHEMICAL COMPANY, INC., Tokyo (JP)

(72) Inventors: Fumiaki Kakeya, Saitama (JP); Takahiro Matsumoto, Chiba (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 27 days.

(21) Appl. No.: 15/547,161

(22) PCT Filed: Feb. 3, 2016

(86) PCT No.: PCT/JP2016/053173
§ 371 (c)(1),
(2) Date: Jul. 28, 2017

(87) PCT Pub. No.: WO2016/125818
PCT Pub. Date: Aug. 11, 2016

(65) Prior Publication Data
US 2018/0022849 A1    Jan. 25, 2018

(30) Foreign Application Priority Data
Feb. 6, 2015 (JP) .................... 2015-021819

(51) Int. Cl.
*C08F 222/22* (2006.01)
*B32B 27/18* (2006.01)
*B32B 27/30* (2006.01)
*C08K 5/00* (2006.01)

(52) U.S. Cl.
CPC ............ *C08F 222/22* (2013.01); *B32B 27/18* (2013.01); *B32B 27/308* (2013.01); *C08K 5/0008* (2013.01); *B32B 2305/72* (2013.01); *B32B 2309/105* (2013.01); *B32B 2310/0831* (2013.01)

(58) Field of Classification Search
CPC ................. C08F 222/22; C08F 2222/1013
USPC .................... 522/96, 152; 526/282
See application file for complete search history.

(56) References Cited

FOREIGN PATENT DOCUMENTS

| CN | 101203537 A | 6/2008 |
|---|---|---|
| EP | 2 133 374 A1 | 12/2009 |
| JP | 9-110947 | 4/1997 |
| JP | 2000-191710 | 7/2000 |
| JP | 2006-316189 | 11/2006 |
| JP | 2007-039482 | 2/2007 |
| JP | 2007-056180 | 3/2007 |
| JP | 2007-204736 | 8/2007 |
| JP | 4003800 | 11/2007 |
| JP | 2008-150484 | 7/2008 |
| JP | 2008-222816 A | 9/2008 |
| JP | 2009-114302 | 5/2009 |
| JP | 2009-286972 | 12/2009 |
| JP | 2011-012145 | 1/2011 |
| JP | 2013-108009 | 6/2013 |
| JP | 5301752 | 9/2013 |
| WO | 97/14737 | 4/1997 |
| WO | WO-9714737 A1 * | 4/1997 .......... C08F 290/067 |

OTHER PUBLICATIONS

Online translation of Detailed Description of JP 2009-114302A (Year: 2009).*
Online translation of Detailed Description of JP 2007-204736A (Year: 2007).*
International Search Report issued in Patent Application No. PCT/JP2016/053173, dated Apr. 12, 2016.
European Search Report issued with respect to Application No. 16746649.9, dated Aug. 13, 2018.

* cited by examiner

*Primary Examiner* — Fred M Teskin
(74) *Attorney, Agent, or Firm* — Greenblum & Bernstein, P.L.C.

(57) ABSTRACT

When achieving high hardness by forming a hardcoat layer including only organic matter, cure shrinkage increases, a film on which the hardcoat layer is formed curls, and in extreme cases, the hardcoat layer is prone to cracking; on the other hand, when attempting to suppress cure shrinkage, it is difficult for sufficient high hardness to be exhibited. Furthermore, organic/inorganic hybrid curable resin compositions use inorganic matter such as silica in order to increase hardness. However, this leads to the problem of the inherent properties of the resin, such as workability, being lost. The abovementioned problems have been solved by a curable resin composition containing: a urethane (meth)acrylate, which is a reactant comprising norbornane diisocyanate and a compound having one hydroxyl group and one or more (meth)acryloyl groups in a molecule; and a (meth)acrylate monomer, which is a reactant comprising a polyol having a condensed polycyclic structure, and (meth)acrylic acid.

16 Claims, No Drawings

CURABLE RESIN COMPOSITION, CURED PRODUCT, AND LAMINATE

TECHNICAL FIELD

The present invention relates to a curable resin composition, a cured product obtained by curing the resin composition, and a laminate comprising the cured product.

BACKGROUND ART

Optical films are generally used as protective films for optical components. Optical films are provided on one or both surfaces with a hard coat layer to prevent flaws on their surface due to handling during their production and/or to prevent flaws made by a user when used on the outermost surface.

Flaws made by a user include, for example, flaws caused when a mobile phone such as a smartphone having a display on its front side and a metal key are put together into a pocket where the metal key rubs against the surface of the display. In recent years, hard coat layers have been required to have particularly high mar resistance for the purpose of preventing such flaws.

With these circumstances as a background, curable resin compositions have been developed. Patent Documents 1 to 3 disclose curable resin compositions for use as hard coat layers, which are composed of organic materials. In addition, Patent Documents 4 to 7 disclose organic-inorganic hybrid type curable resin compositions comprising inorganic fillers, typified by colloidal silica and fine dry silica particles, with the aim of achieving higher hardness.

PRIOR ART DOCUMENTS

Patent Documents

Patent Document 1: Japanese Patent No. 4003800
Patent Document 2: JP 2000-191710
Patent Document 3: Japanese Patent No. 5301752
Patent Document 4: JP 2013-108009
Patent Document 5: JP 2011-012145
Patent Document 6: JP 2009-286972
Patent Document 7: JP 2008-150484

SUMMARY OF THE INVENTION

Problem to be Solved by the Invention

When attempting to achieve higher hardness by formation of a hard coat layer composed only of organic materials as described in Patent Documents 1 and 2, shrinkage on curing will be increased and a film provided with a hard coat layer will be curled, so that the hard coat layer will be more likely to develop cracks. On the other hand, when attempting to reduce shrinkage on curing in consideration of crack development, sufficiently high hardness cannot be achieved.

In Patent Document 3, a combination of starting materials for a urethane acrylate oligomer which is used as a major component of hard coat coating materials, i.e., a combination of a polyol and an isocyanate is adjusted in an attempt to overcome the above problem. However, there is a problem in that the resulting hard coat layer is low in steel wool mar resistance.

Moreover, in the organic-inorganic hybrid type curable resin compositions disclosed in Patent Documents 4 to 7, inorganic materials (e.g., silica) are used to increase their hardness. However, there is a problem in that these inorganic materials will impair processability and other characteristics inherent to resins. For example, when a film is cut into a given size, fine cracks will develop on the cut surface. This is because coating films modified to have higher hardness with the use of inorganic materials (e.g., silica) will have properties close to those of glass.

The present invention has been made under these circumstances.

Solution to Problem

As a result of extensive and intensive efforts, the inventors of the present invention have found a resin composition which can solve the problems stated above. Namely, the present invention is as follows.

1. A curable resin composition comprising: urethane (meth)acrylate (A) which is a reaction product between norbornane diisocyanate (a1) and a compound (a2) having one hydroxyl group and at least one or more (meth)acryloyl groups in a single molecule; and a (meth)acrylate monomer (B) which is a reaction product between a polyol having a fused polycyclic structure (b1) and (meth)acrylic acid (b2).
2. The curable resin composition according to 1 above, wherein the compound (a2) is a compound having one hydroxyl group and three to five (meth)acryloyl groups in a single molecule.
3. The curable resin composition according to 1 or 2 above, wherein the polyol having a fused polycyclic structure (b1) is a cycloaliphatic polyol having a fused polycyclic structure.
4. The curable resin composition according to any one of 1 to 3 above, wherein the polyol having a fused polycyclic structure (b1) is tricyclodecane dimethanol.
5. The curable resin composition according to any one of 1 to 4 above, which comprises 20 to 90 parts by mass of the urethane (meth)acrylate (A) and 10 to 35 parts by mass of the (meth)acrylate monomer (B), relative to 100 parts by mass of the curable resin composition.
6. The curable resin composition according to any one of 1 to 5 above, which further comprises a compound (C) having at least three or more (meth)acryloyl groups in a single molecule.
7. The curable resin composition according to 6 above, wherein the compound (C) is a reaction product between dipentaerythritol and (meth)acrylic acid and has at least five or more (meth)acryloyl groups.
8. The curable resin composition according to any one of 1 to 7 above, which further comprises a photopolymerization initiator (D), wherein the photopolymerization initiator (D) is contained in an amount of 1 to 10 parts by mass, relative to 100 parts by mass of the curable resin composition except for the photopolymerization initiator (D).
9. The curable resin composition according to any one of 1 to 8 above, which further comprises a UV absorber (E), wherein the UV absorber (E) is contained in an amount of 0.1 to 10 parts by mass, relative to 100 parts by mass of the curable resin composition except for the UV absorber (E).
10. A cured product obtained by irradiating the curable resin composition according to any one of 1 to 8 above with active energy rays.
11. The cured product according to 10 above, wherein the active energy rays are ultraviolet rays.
12. A laminate obtained by molding the cured product according to 10 or 11 above on a substrate.
13. The laminate according to 12 above, wherein the cured product has a thickness of 5 to 200 μm.

14. The laminate according to 12 or 13 above, wherein the substrate is made of a thermoplastic resin.

15. The laminate according to 14 above, wherein the thermoplastic resin comprises at least one of polycarbonate, polyethylene terephthalate and polymethyl methacrylate.

16. A laminate obtained by applying the curable resin composition according to any one of 1 to 9 above onto a resin substrate, followed by irradiation with active energy rays.

DESCRIPTION OF EMBODIMENTS

The curable resin composition of the present invention comprises the following two components:
(A) urethane (meth)acrylate which is a reaction product between norbornane diisocyanate (a1) and a compound (a2) having one hydroxyl group and at least one or more (meth)acryloyl groups in a single molecule; and
(B) a (meth)acrylate monomer which is a reaction product between a polyol having a fused polycyclic structure (b1) and (meth)acrylic acid (b2).

The norbornane diisocyanate (a1) to be used in the component (A) refers to a compound having two isocyanate groups attached to a cycloaliphatic hydrocarbon with a bridged structure, and may be selected as appropriate from among commercially available products. Such commercially available products may be exemplified by NBDI (Mitsui Chemicals, Inc., Japan). The structure of the norbornane diisocyanate (a1) (general formula: $R_1$-A-$R_2$, wherein A represents a norbornane ring, $R_1$ and $R_2$ each independently represent $R_3$NCO, and $R_3$ represents an alkylene group containing 0 to 3 carbon atoms) is, for example, as shown in the following formula (I).

[Formula 1]

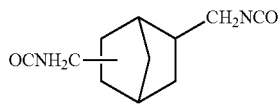
(I)

The compound (a2) to be used in the component (A), which has one hydroxyl group and at least one or more (meth)acryloyl groups of the following formula (II) in a single molecule, may be exemplified by poly(meth)acrylates of polyhydroxyl group-containing compounds, including trimethylolpropane di(meth)acrylate, pentaerythritol tri(meth)acrylate, dipentaerythritol penta(meth)acrylate and so on.

[Formula 2]

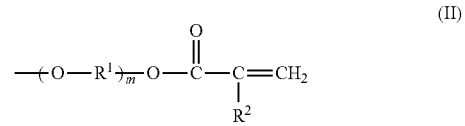
(II)

(wherein $R^1$ is a linear or branched alkylene group containing 2 to 5 carbon atoms, $R^2$ is a hydrogen atom or a methyl group, and m represents the number of repeating units and is an integer of 1 to 5).

Preferred specific examples of the compound (a2) having one hydroxyl group and at least one or more (meth)acryloyl groups in a single molecule include those having the structures represented by the following formulae (III) and (IV):

[Formula 3]

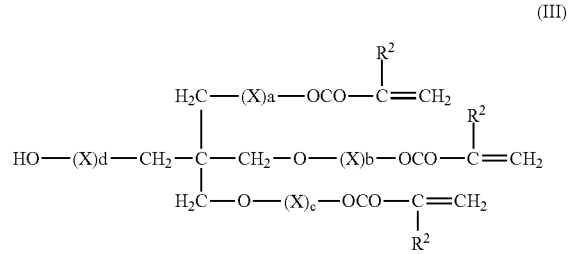
(III)

(wherein a+b+c+d=0 to 8, preferably 0, 4 or 8, X is a linear or branched alkylene group containing 1 to 6 carbon atoms, and $R^2$ is a hydrogen atom or a methyl group); and

[Formula 4]

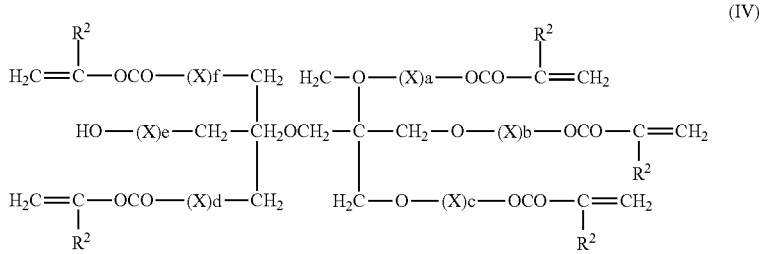
(IV)

(wherein a+b+c+d+e+f=0 to 12, preferably 0, 6 or 12, X is a linear or branched alkylene group containing 1 to 6 carbon atoms, and $R^2$ is a hydrogen atom or a methyl group).

Moreover, it is also possible to use an adduct of such a poly(meth)acrylate and ε-caprolactone, an adduct of such a poly(meth)acrylate and an alkylene oxide, or an epoxy (meth)acrylate, etc. These candidates for the compound (a2) may be used either alone or in combination.

In the context of the present invention, the term "(meth) acrylate" is intended to mean either or both of methacrylate and acrylate, and the same goes for the terms "(meth) acryloyl group" and "(meth)acrylic acid."

As candidates for the compound (a2), those having three to five (meth)acryloyl groups are preferred for use in terms of obtaining a high-hardness layer (hard coat layer). Among them, pentaerythritol tri(meth)acrylate or dipentaerythritol penta(meth)acrylate is more preferred for use.

The urethane (meth)acrylate (A) to be used in the present invention may be obtained by nucleophilic addition reaction between an isocyanate group in the above norbornane diisocyanate (a1) and a hydroxyl group in the above hydroxyl group-containing acrylate compound (a2). This nucleophilic addition reaction may be conducted in accordance with any procedures selected as appropriate from various known procedures. It should be noted that the urethane (meth) acrylate (A) preferably has the structure shown in the following formula (V):

[Formula 5]

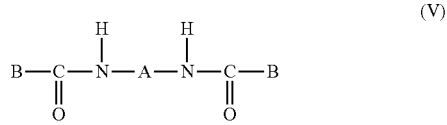

(V)

(wherein A represents the same norbornane ring as in the general formula $R_1$-A-$R_2$ of the above norbornane diisocyanate (a1), and B represents an acrylate moiety (i.e., a substituent generated by removal of hydrogen from the hydroxyl group of the above compound (a2))).

The ratio of the compound (a2) to be used in the above addition reaction is preferably 0.1 to 50 equivalents, more preferably 0.1 to 10 equivalents, and even more preferably 0.9 to 1.2 equivalents, when calculated as a hydroxyl group equivalent of the compound (a2) relative to one isocyanate group equivalent of the norbornane diisocyanate (a1).

In addition, the temperature of the reaction between the above norbornane diisocyanate (a1) and the above compound (a2) is preferably 30° C. to 150° C., and more preferably 50° C. to 100° C. It should be noted that the end point of the reaction can be confirmed, for example, by disappearance of the infrared absorption spectrum at 2250 $cm^{-1}$ showing isocyanate groups or by determination of the isocyanate group content in accordance with JIS K 7301-1995.

Moreover, a catalyst may be used in the above addition reaction for the purpose of reducing the reaction time. Examples of such a catalyst include basic catalysts such as amines (e.g., pyridine, pyrrole, triethylamine, diethylamine, dibutylamine, ammonia) and phosphines (e.g., tributylphosphine, triphenylphosphine), as well as acidic catalysts such as metal alkoxides (e.g., copper naphthenate, cobalt naphthenate, zinc naphthenate, tributoxyaluminum, tetrabutoxytrititanium, tetrabutoxyzirconium), Lewis acids (e.g., aluminum chloride) and tin compounds (e.g., dibutyltin dilaurate, dibutyltin diacetate). Among them, preferred are acidic catalysts, and most preferred is dibutyltin dilaurate which is a tin compound.

The amount of a catalyst to be used in the above addition reaction is preferably 0.1 to 1 part by mass, relative to 100 parts by mass of the norbornane diisocyanate (a1).

In the above addition reaction, a solvent may optionally be used, including toluene, xylene, ethyl acetate, butyl acetate, methyl ethyl ketone, methyl isobutyl ketone, cyclohexanone and so on, or alternatively, a radical polymerizable monomer having no moiety reactive with isocyanate, e.g., a radical polymerizable monomer having no hydroxyl or amino group may be used as a solvent. These solvents and monomers may be used either alone or in combination.

The ratio of the urethane (meth)acrylate (A) in the curable resin composition is 10 to 99 parts by mass in 100 parts by mass of the curable resin composition. At a lower ratio, the surface hardness may be reduced upon curing. On the other hand, at a higher ratio, cracks may be more likely to develop due to shrinkage on curing, etc. The ratio of the urethane (meth)acrylate (A) in the curable resin composition is preferably 20 to 90 parts by mass, more preferably 20 to 80 parts by mass, relative to 100 parts by mass of the curable resin composition.

The (meth)acrylate monomer (B) for use in the curable resin composition of the present invention is used for the purpose of imparting flexibility to the cured product while maintaining hardness and mar resistance. This component (B) is a reaction product between a polyol having a fused polycyclic structure (b1) and (meth)acrylic acid (b2). Such a reaction product is synthesized by dehydroesterification reaction between the polyol (b1) and (meth)acrylic acid or by transesterification reaction.

Such a polyol having a fused polycyclic structure (b1) is not limited in any way, and examples include hydroxyalkylated compounds of indene, naphthalene, azulene, anthracene and so on; bicyclo[5,3,0]decane dimethanol, bicyclo[4,4,0]decane dimethanol, bicyclo[4,3,0]nonane dimethanol, norbornane dimethanol, tricyclodecane dimethanol, 1,3-adamantanediol (1,3-dihydroxytricyclo[3.3.1.13,7]decane) and so on. In the present invention, the component (B) is used for the purpose of imparting flexibility, and hence dimethanol having a fused polycyclic structure is preferred for this purpose. Above all, tricyclodecane dimethanol is most preferred and a commercially available product thereof may be obtained readily.

In the present invention, the (meth)acrylic acid (b2) is intended to also include ester forms of (meth)acrylic acid, specifically as exemplified by unsaturated carboxylic acids, i.e., acrylic acid and methacrylic acid, as well as ester forms thereof, i.e., methyl acrylate, ethyl acrylate, methyl methacrylate, ethyl methacrylate, etc.

When the above component (B) is synthesized by dehydroesterification reaction, an unsaturated carboxylic acid may be used as the (meth)acrylic acid (b2). Above all, acrylic acid is preferred in terms of curing reactivity.

Likewise, when the above component (B) is synthesized by esterification reaction, a (meth)acrylic acid ester may be used as the component (b2). Above all, methyl acrylate is preferred for use in terms of curing reactivity. They may be readily obtained as commercially available products.

Tricyclodecane dimethanol is used as the above compound (b1) and acrylic acid is used as the above compound (b2) to obtain tricyclodecane diacrylate, which is particularly preferred as a bifunctional (meth)acrylate monomer (B). The use of such a bifunctional (meth)acrylate monomer (B) achieves impartment of flexibility and high hardness and mar resistance in the resin composition obtained after curing the curable resin composition. It should be noted that for synthesis of the (meth)acrylate monomer (B), dehydroesterification or transesterification with an acrylic acid ester may be selected as appropriate, or alternatively, a commercially available product may be used.

The ratio of the (meth)acrylate monomer (B) in the curable resin composition is 5 to 40 parts by mass in 100 parts by mass of the curable resin composition. At a lower ratio, cracks may be more likely to develop due to shrinkage on curing and/or bending, etc. On the other hand, at a higher ratio, the mar resistance and surface hardness may be reduced upon curing. The ratio of the (meth)acrylate monomer (B) in the curable resin composition is preferably 10 to 35 parts by mass, and more preferably 15 to 30 parts by mass.

In the present invention, to further improve the mar resistance and surface hardness of the cured resin composition, a compound (C) having at least three or more (meth)acryloyl groups in a single molecule, i.e., a penta- or higher functional acrylate monomer is preferably contained. Namely, the compound (C) preferably has at least five or more (meth)acryloyl groups.

Specific examples of such a compound (C) include the compounds previously listed as candidates for (a2), more specifically reaction products between hydroxyl groups of these compounds and (meth)acrylic acid. For example, the compound (C) is a reaction product between dipentaerythritol and (meth)acrylic acid. For reaction, standard procedures may be used, as exemplified by esterification reaction between acrylic acid and a polyol having three or more hydroxyl groups, or transesterification reaction between an acrylic acid ester and a polyol having three or more hydroxyl groups.

Among these compounds, a reaction product between dipentaerythritol and (meth)acrylic acid, i.e., a (meth)acrylate monomer is preferred. Particularly preferred is a penta- or hexa-functional acrylate monomer obtained by providing 5 or more moles of (meth)acrylic acid to 1 mole of dipentaerythritol.

The ratio of the compound (C) in the curable resin composition is 10 to 99 parts by mass in 100 parts by mass of the curable resin composition. At a lower ratio, the mar resistance may be reduced or the surface hardness may be reduced upon curing. On the other hand, at a higher ratio, cracks may be more likely to develop due to shrinkage on curing, etc. It should be noted that the ratio of the compound (C) in the curable resin composition is preferably 20 to 90 parts by mass, and more preferably 20 to 80 parts by mass.

In the curable resin composition of the present invention, in order to facilitate curing with ultraviolet rays, a photopolymerization initiator (D) is preferred for use.

Such a photopolymerization initiator (D) may be of any type as long as it produces the effect of the present invention. Examples include 1-hydroxy-cyclohexyl-phenyl ketone, 2,2-dimethoxy-1,2-diphenylethan-1-one, 1-cyclohexyl phenyl ketone, 2-hydroxy-2-methyl-1-phenyl-propan-1-one, 1-[4-(2-hydroxyethoxy)-phenyl]-2-hydroxy-2-methyl-1-propan-1-one, 2-methyl-1-[4-(methylthio)phenyl]-2-morpholinopropan-1-one, 2-benzyl-2-dimethylamino-1-(4-morpholinophenyl)-butanone-1, bis(2,4,6-trimethylbenzoyl)-phenylphosphine oxide, 2,4,6-trimethylbenzoyl-diphenylphosphine oxide, 4-methylbenzophenone and so on, which may be used either alone or in combination.

The mass of the photopolymerization initiator (D) to be contained is in the range of 1 to 10 parts by mass, relative to 100 parts by mass of a major component mixture consisting of the urethane (meth)acrylate (A), the (meth)acrylate monomer (B) and the compound (C), i.e., relative to 100 parts by mass of the curable resin composition except for the photopolymerization initiator (D).

If the mass of the photopolymerization initiator (D) is above this range, cracks may be more likely to develop upon curing. On the other hand, if the mass of the photopolymerization initiator (D) is below this range, curing may be insufficient. The mass of the photopolymerization initiator (D) to be contained is preferably 1 to 7 parts by mass, and more preferably 3 to 5 parts by mass.

In the curable resin composition of the present invention, a UV absorber (E) is preferred for use in terms of improved weather resistance for outdoor use.

Such a UV absorber (E) is not limited in any way as long as it is used in the art. Examples include triazine-based UV absorbers, benzophenone-based UV absorbers, benzotriazole-based UV absorbers, cyanoacrylate-based UV absorbers, hydroxybenzoate-based UV absorbers and so on, which may be used either alone or in combination.

Among them, the UV absorber (E) is preferably at least one selected from the group consisting of triazine-based UV absorbers, benzophenone-based UV absorbers and benzotriazole-based UV absorbers. In particular, when applied to a PC substrate, the UV absorber (E) is preferably a triazine-based UV absorber whose absorption band is matched with that of the PC substrate.

The above triazine-based UV absorbers may be exemplified by 2,4-bis[hydroxy-4-butoxyphenyl]-6-(2,4-dibutoxyphenyl)-1,3,5-triazine, 2-(2-hydroxy-4-hydroxymethylphenyl)-4,6-diphenyl-1,3,5-triazine, 2-(2-hydroxy-4-hydroxymethylphenyl)-4,6-bis(2,4-dimethylphenyl)-1,3,5-triazine, 2-[2-hydroxy-4-(2-hydroxyethyl)phenyl]-4,6-diphenyl-1,3,5-triazine, 2-[2-hydroxy-4-(2-hydroxyethyl)phenyl]-4,6-bis(2,4-dimethylphenyl)-1,3,5-triazine, 2-[2-hydroxy-4-(2-hydroxyethoxy)phenyl]-4,6-diphenyl-1,3,5-triazine, 2-[2-hydroxy-4-(2-hydroxyethoxy)phenyl]-4,6-bis(2,4-dimethylphenyl)-1,3,5-triazine, 2-[2-hydroxy-4-(3-hydroxypropyl)phenyl]-4,6-diphenyl-1,3,5-triazine, 2-[2-hydroxy-4-(3-hydroxypropyl)phenyl]-4,6-bis(2,4-dimethylphenyl)-1,3,5-triazine, 2-[2-hydroxy-4-(3-hydroxypropoxy)phenyl]-4,6-diphenyl-1,3,5-triazine, 2-[2-hydroxy-4-(3-hydroxypropoxy)phenyl]-4,6-bis(2,4-dimethylphenyl)-1,3,5-triazine, 2-[2-hydroxy-4-(4-hydroxybutyl)phenyl]-4,6-diphenyl-1,3,5-triazine, 2-[2-hydroxy-4-(4-hydroxybutyl)phenyl]-4,6-bis(2,4-dimethylphenyl)-1,3,5-triazine, 2-[2-hydroxy-4-(4-hydroxybutoxy)phenyl]-4,6-diphenyl-1,3,5-triazine, 2-[2-hydroxy-4-(4-hydroxybutoxy)phenyl]-4,6-bis(2,4-dimethylphenyl)-1,3,5-triazine, 2-(2-hydroxy-4-hydroxymethylphenyl)-4,6-bis(2-hydroxy-4-methylphenyl)-1,3,5-triazine, 2-[2-hydroxy-4-(2-hydroxyethyl)phenyl]-4,6-bis(2-hydroxy-4-methylphenyl)-1,3,5-triazine, 2-[2-hydroxy-4-(2-hydroxyethoxy)phenyl]-4,6-bis(2-hydroxy-4-methylphenyl)-1,3,5-triazine, 2-[2-hydroxy-4-(3-hydroxypropyl)phenyl]-4,6-bis(2-hydroxy-4-methylphenyl)-1,3,5-triazine, 2-[2-hydroxy-4-(3-hydroxypropoxy)phenyl]-4,6-bis(2-hydroxy-4-methylphenyl)-1,3,5-triazine, 2-[4,6-bis(2,4-dimethylphenyl)-1,3,5-triazin-2-yl]-5-(octyloxy)phenol, 2-(4,6-diphenyl-1,3,5-triazin-2-yl)-5-[(hexyl)oxy]-phenol, 2-(2-hydroxy-4-[1-octyloxycarbonylethoxy]phenyl)-4,6-bis(4-phenylphenyl)-1,3,5-triazine, a reaction product between 2-(4,6-bis(2,4-dimethylphenyl)-1,3,5-triazin-2-yl)-5-hydroxyphenyl and [($C_{10}$-$C_{16}$, primarily $C_{12}$-$C_{13}$ alkyloxy)methyl]oxirane, a reaction product between 2-(2,4-dihydroxyphenyl)-4,6-bis-(2,4-dimethylphenyl)-1,3,5-triazine and (2-ethylhexyl)-glycidic acid ester, etc.

The benzophenone-based UV absorbers may be exemplified by 2,2'-dihydroxy-4,4'-di(hydroxymethyl)benzophenone, 2,2'-dihydroxy-4,4'-di(2-hydroxyethyl)benzophenone, 2,2'-dihydroxy-3,3'-dimethoxy-5,5'-di(hydroxymethyl)benzophenone, 2,2'-dihydroxy-3,3'-dimethoxy-5,5'-di(2-hydroxyethyl)benzophenone, 2,2'-dihydroxy-3,3'-di(hydroxymethyl)-5,5'-dimethoxybenzophenone, 2,2'- dihydroxy-3,3'-di(2-hydroxyethyl)-5,5'-dimethoxybenzophenone, 2,2-dihydroxy-4,4-dimethoxybenzophenone, etc.

The benzotriazole-based UV absorbers may be exemplified by 2-[2'-hydroxy-5'-(hydroxymethyl)phenyl]-2H-benzotriazole, 2-[2'-hydroxy-5'-(2-hydroxyethyl)phenyl]-2H-benzotriazole, 2-[2'-hydroxy-5'-(3-hydroxypropyl)phenyl]-2H-benzotriazole, 2-[2'-hydroxy-3'-methyl-5'-(hydroxymethyl)phenyl]-2H-benzotriazole, 2-[2'-hydroxy-3'-methyl-5'-(2-hydroxyethyl)phenyl]-2H-benzotriazole, 2-[2'-hydroxy-3'-methyl-5'-(3-hydroxypropyl)phenyl]-2H-benzotriazole, 2-[2'-hydroxy-3'-t-butyl-5'-(hydroxymethyl)phenyl]-2H-benzotriazole, 2-[2'-hydroxy-3'-t-butyl-5'-(2-hydroxyethyl)phenyl]-2H-benzotriazole, 2-[2'-hydroxy-3'-t-butyl-5'-(2-hydroxyethyl)phenyl]-5-chloro-2H-benzotriazole, 2-[2'-hydroxy-3'-t-butyl-5'-(3-hydroxypropyl)phenyl]-2H-benzotriazole, 2-[2'-hydroxy-3'-t-octyl-5'-(hydroxymethyl)phenyl]-2H-benzotriazole, 2-[2'-hydroxy-3'-t-octyl-5'-(2-hydroxyethyl)phenyl]-2H-benzotriazole, 2-[2'-hydroxy-3'-t-octyl-5'-(3-hydroxypropyl)phenyl]-2H-benzotriazole, etc., or alternatively, 2,2'-methylenebis[6-(2H-benzotriazol-2-yl)-4-(hydroxymethyl)phenol], 2,2'-methylenebis[6-(2H-benzotriazol-2-yl)-4-(2-hydroxyethyl)phenol], 2,2'-methylenebis[6-(5-chloro-2H-benzotriazol-2-yl)-4-(2-hydroxyethyl)phenol], 2,2'-methylenebis[6-(5-bromo-2H-benzotriazol-2-yl)-4-(2-hydroxyethyl)phenol], 2,2'-methylenebis[6-(2H-benzotriazol-2-yl)-4-(3-hydroxypropyl)phenol], 2,2'-methylenebis[6-(5-chloro-2H-benzotriazol-2-yl)-4-(3-hydroxypropyl)phenol], 2,2'-methylenebis[6-(5-bromo-2H-benzotriazol-2-yl)-4-(3-hydroxypropyl)phenol], 2,2'-methylenebis[6-(2H-benzotriazol-2-yl)-4-(4-hydroxybutyl)phenol], 2,2'-methylenebis[6-(5-chloro-2H-benzotriazol-2-yl)-4-(4-hydroxybutyl)phenol], 2,2'-methylenebis[6-(5-bromo-2H-benzotriazol-2-yl)-4-(4-hydroxybutyl)phenol], 3,3-{2,2'-bis[6-(2H-benzotriazol-2-yl)-1-hydroxy-4-(2-hydroxyethyl)phenyl]}propane, 2,2-{2,2'-bis[6-(2H-benzotriazol-2-yl)-1-hydroxy-4-(2-hydroxyethyl)phenyl]}butane, 2,2'-oxybis[6-(2H-benzotriazol-2-yl)-4-(2-hydroxyethyl)phenol], 2,2'-bis[6-(2H-benzotriazol-2-yl)-4-(2-hydroxyethyl)phenol] sulfide, 2,2'-bis[6-(2H-benzotriazol-2-yl)-4-(2-hydroxyethyl)phenol] sulfoxide, 2,2'-bis[6-(2H-benzotriazol-2-yl)-4-(2-hydroxyethyl)phenol] sulfone, 2,2'-bis[6-(2H-benzotriazol-2-yl)-4-(2-hydroxyethyl)phenol] amine, etc.

The cyanoacrylate-based UV absorbers may be exemplified by 2-ethylhexyl-2-cyano-3,3'-diphenylacrylate, ethyl-2-cyano-3,3'-diphenylacrylate, etc.

The hydroxybenzoate-based UV absorbers may be exemplified by phenyl salicylate, 4-t-butylphenyl salicylate, 2,5-t-butyl-4-hydroxybenzoic acid n-hexadecyl ester, 2,4-di-t-butylphenyl-3',5-di-t-butyl-4'-hydroxybenzoate, etc.

The mass of the UV absorber (E) to be contained is 0.1 to 10 parts by mass, relative to 100 parts by mass of a mixture consisting of the urethane (meth)acrylate (A), the (meth)acrylate monomer (B), the compound (C) and the photopolymerization initiator (D), i.e., relative to 100 parts by mass of the curable resin composition except for the UV absorber (E). If the mass of the UV absorber (E) is above this range, the photopolymerization initiation action of the photopolymerization initiator (D) may be inhibited to thereby result in insufficient curing. On the other hand, if the mass of the UV absorber (E) is below this range, yellowing may be more likely to occur due to sunlight or the like particularly in outdoor use. The mass of the UV absorber (E) to be contained is preferably 2 to 7 parts by mass, and more preferably 3 to 5 parts by mass.

The curable resin composition of the present invention may further comprise an antioxidant, a light stabilizer, a leveling agent, a pigment, an inorganic filler, an organic filler, an organic solvent and so on, as long as the effect of the present invention is not impaired.

The curable resin composition of the present invention is a mixture prepared from the above urethane (meth)acrylate (A), the above (meth)acrylate monomer (B) and the above compound (C), optionally together with the above photopolymerization initiator (D) and the above UV absorber component (F) and other additives at a given compositional ratio. For mixing of these components, they may be mixed optionally under heating conditions. Further, an organic solvent is preferably added to reduce the viscosity and to improve the handling properties. Such an organic solvent is not limited in any way as long as it is compatible and volatile, and examples include ketones (e.g., methyl ethyl ketone, methyl isobutyl ketone) and glycol ethers (e.g., methoxypropanol, ethylene glycol monomethyl ether). It should be noted that the mixing operation is preferably conducted in a light-shielded environment because the compound (C) is photoreactive.

The cured product of the present invention may be prepared, for example, by irradiating the above curable resin composition with active energy rays (e.g., ultraviolet rays, electron beams) to cure the resin composition.

When the active energy rays are ultraviolet rays, a source of the active energy rays may be exemplified by a high pressure mercury lamp and a metal halide lamp, etc.

The irradiation energy of ultraviolet rays is preferably 100 to 2,000 mJ/cm$^2$.

On the other hand, when the active energy rays are electron beams, a source of the active energy rays may be exemplified by scanning-type electron beam irradiation, curtain-type electron beam irradiation, etc.

The irradiation energy of electron beams is preferably 10 to 200 kGy.

The laminate of the present invention may be prepared by applying the above curable resin composition onto a substrate and then irradiating active energy rays to cure the coating film.

Such a substrate to be used in the laminate of the present invention may be made of a thermoplastic resin. Examples include plastic films made of polypropylene resin, polycarbonate resin, polyethylene resin, polyethylene terephthalate resin, polyethylene naphthalate resin, polymethyl methacrylate resin, polystyrene resin and so on. In particular, in cases where transparency and stiffness are required, preferred is a substrate made of polyethylene terephthalate resin or polymethyl methacrylate resin as a major component. Likewise, in cases where transparency and heat resistance are required, preferred is a substrate made of polycarbonate resin as a major component. The thickness is generally 10 to 500 μm, preferably 30 μm to 300 μm, and more preferably 50 μm to 200 μm.

Any technique may be used to apply the curable resin composition of the present invention onto the substrate, and examples include gravure coating, reverse coating, die coating, bar coating, lip coating, blade coating, roll coating, roll coating, knife coating, curtain coating, slot orifice coating, spray coating, ink jet coating and so on.

In the laminate of the present invention, the cured product layer obtained by curing the curable resin composition preferably has a thickness of 5 to 200 μm. If the cured product layer is thinner than this range, the layer may be less likely to have surface hardness. On the other hand, if the cured product layer is thicker than this range, it may be difficult to prevent crack development. The thickness of the cured product layer is more preferably 5 μm to 100 μm, and particularly preferably 10 μm to 50 μm.

EXAMPLES

The present invention will be further described in more detail by way of the following examples and comparative examples. However, the present invention is not limited to these examples, and the mode to carry out the present invention can be modified as long as the effect of the present invention is provided. It should be noted that parts and % in the following examples and comparative examples are intended to mean parts by mass and % by mass, respectively, unless otherwise specified.

Synthesis Example 1

A five-necked flask equipped with a stirring unit, a thermometer, a condenser, a dropping funnel and a dry air inlet tube was flushed in advance with dry air to dry the interior of the system, and then charged with 100 parts by mass of norbornane diisocyanate (a1), 271.2 parts by mass of a mixture consisting of 56% pentaerythritol triacrylate (a2) and 44% pentaerythritol tetraacrylate (a2), and 101.2 parts by mass of 2-butanone as a solvent, followed by heating to 60° C. Subsequently, the flask was charged with 0.08 parts by mass of dibutyltin dilaurate as a polymerization catalyst and 0.16 parts by mass of dibutylhydroxytoluene as a polymerization inhibitor, and then cooled such that the temperature after heat generation was 80° C. to 90° C., followed by infrared absorption spectroscopy to confirm that the isocyanate residues in the reaction mixture had been consumed, thereby obtaining a 2-butanone solution of urethane acrylate (A) in an amount of 506.1 parts by mass (solid matter content: 80%).

Example 1

Relative to 125 parts by mass of the 2-butanone solution of urethane acrylate (A) (solid matter content: 80%) obtained in Synthesis Example 1, i.e., relative to 100 parts by mass of the urethane acrylate (A) calculated as solid matter, 20 parts by mass of tricyclodecane diacrylate (A-DCP, Shin-Nakamura Chemical Co., Ltd., Japan), which is an esterification reaction product between tricyclodecane dimethanol (b1) and acrylic acid (b2), was added as the above component (B) to give a major component mixture.

100 parts by mass of this major component mixture was mixed with 5 parts by mass of 1-hydroxy-cyclohexyl-phenyl ketone (D) as a photopolymerization initiator to obtain a curable resin composition.

This curable resin composition was applied with a bar coater onto the surface of a polyethylene terephthalate film of 250 μm thickness (serving as a substrate) and dried at 50° C. for 1 minute. This polyethylene terephthalate film, on which the curable resin composition was applied, was irradiated with ultraviolet rays at an accumulated exposure amount of 500 mJ/cm$^2$ using a high pressure mercury lamp to form a cured product on the surface of the polyethylene terephthalate film, i.e., to obtain a hard coat film, which was found to be a coating film without any cracks and with a good appearance.

Ultrafine #0000 steel wool was contacted under a load of 100 gf/cm$^2$ with the surface of the cured product on the polyethylene terephthalate film placed horizontally. After 15 times reciprocating abrasion, a flaw-induced change in the haze value (cloudiness) before and after abrasion was determined. Before and after abrasion, there was no occurrence of flaws, and the change in the haze value was 0.20%.

The resulting hard coat film was cut into a 10 cm square piece, which was then fixed with a cellophane tape at its four corners on a glass plate and measured for its surface pencil hardness in accordance with JIS K 5600-5-4 (1999) by using a pencil scratch tester for coated film. The surface pencil hardness was found to be 8H.

When the resulting hard coat film was wrapped half around a 40 mm φ metal roll, there was no occurrence of cracks.

Example 2

The same procedure as shown in Example 1 was repeated, except that a polycarbonate film of 200 μm thickness was used as a film to be applied with the curable resin composition.

The coating film thickness was found to be 40 μm. The change in the haze value before and after steel wool abrasion was 0.20%, the surface pencil hardness was found to be 7H, and there was no occurrence of cracks upon wrapping around the 40 mm φ roll.

Example 3

The same procedure as shown in Example 1 was repeated, except that 112.5 parts by mass of the 2-butanone solution of urethane acrylate (A) (solid matter content) obtained in Synthesis Example 1, 20 parts by mass of the same acrylate (B) as used in Example 1, and 90 parts by mass of a mixture of dipentaerythritol pentaacrylate (C) and dipentaerythritol hexaacrylate (C) were mixed to give a major component composition.

The coating film thickness was found to be 40 μm. There was no occurrence of flaws before and after steel wool abrasion, the change in the haze value was 0.0%, the surface pencil hardness was found to be 9H, and there was no occurrence of cracks upon wrapping around the 40 mm φ roll.

Example 4

The same procedure as shown in Example 3 was repeated, except that a polycarbonate film of 200 μm thickness was used as a film to be applied with the curable resin composition.

The coating film thickness was found to be 40 μm. There was no occurrence of flaws before and after steel wool abrasion, the change in the haze value was 0.0%, the surface pencil hardness was found to be 9H, and there was no occurrence of cracks upon wrapping around the 40 mm φ roll.

Comparative Example 1

125 parts by mass of a 2-butanone solution of urethane acrylate (A) (solid matter content: 80%) was mixed with 5 parts by mass of 1-hydroxy-cyclohexyl-phenyl ketone (D) as a photopolymerization initiator, i.e., 100 parts by mass of the hexafunctional urethane acrylate oligomer calculated as solid matter was mixed with 5 parts by mass of 1-hydroxy-cyclohexyl-phenyl ketone (D) as a photopolymerization initiator to give a curable resin composition.

The resulting curable resin composition was applied and cured in the same manner as shown in Example 1. However, cracks were found to develop in the cured product layer on the film surface, and hence the subsequent evaluation was given up.

Comparative Example 2

62.5 parts by mass of a 2-butanone solution of urethane acrylate (A) (solid matter content: 80%) was mixed with 50 parts by mass of a mixture of dipentaerythritol pentaacrylate (C) and dipentaerythritol hexaacrylate (C) to give a major component composition.

The same procedure as shown in Example 1 was repeated using this major component composition. However, cracks were found to develop in the cured product layer on the film surface, and hence the subsequent evaluation was given up.

Comparative Example 3

By reference to Patent Document 3, a five-necked flask equipped with a stirring unit, a thermometer, a condenser, a dropping funnel and a dry air inlet tube was flushed in advance with dry air to dry the interior of the system, and then charged with 100 parts by mass of norbornane diisocyanate (a1), 271.2 parts by mass of a mixture consisting of 56% pentaerythritol triacrylate (a2) and 44% pentaerythritol tetraacrylate (a2), 47.6 parts by mass of tricyclodecane dimethanol (b1), and 102 parts by mass of 2-butanone as a solvent, followed by heating to 60° C. Subsequently, the flask was charged with 0.08 parts by mass of dibutyltin dilaurate as a polymerization catalyst and 0.16 parts by mass of dibutylhydroxytoluene as a polymerization inhibitor, and then cooled such that the temperature after heat generation was 80° C. to 90° C., followed by infrared absorption spectroscopy to confirm that the isocyanate residues in the reaction mixture had been consumed, thereby obtaining a 2-butanone solution of a hexafunctional urethane acrylate oligomer in an amount of 521 parts by mass (solid matter content: 80%).

125 parts by mass of this urethane acrylate oligomer solution was mixed with 5 parts by mass of 1-hydroxy-cyclohexyl-phenyl ketone as a photopolymerization initiator, i.e., 100 parts by mass of the hexafunctional urethane acrylate oligomer calculated as solid matter was mixed with 5 parts by mass of 1-hydroxy-cyclohexyl-phenyl ketone as a photopolymerization initiator to obtain a curable resin composition for which ultraviolet rays were used as active energy rays.

The resulting curable resin composition was applied and cured in the same manner as shown in Example 1. The coating film thickness was found to be 40 μm. Flaws were found to develop upon steel wool abrasion, and the change in the haze value was 1.0%. It should be noted that the surface pencil hardness was found to be 8H, and there was no occurrence of cracks upon wrapping around the 40 mm φ roll.

Comparative Example 4

By reference to Patent Document 4, a reactor equipped with a stirring unit, a condenser tube, a dropping funnel and a nitrogen inlet tube was charged with 480 parts by mass of methyl isobutyl ketone and heated under stirring conditions until the temperature within the system reached 110° C. Then, a mixture consisting of 130 parts by mass of glycidyl methacrylate, 304 parts by mass of methyl methacrylate and 15 parts by mass of t-butyl peroxy-2-ethylhexanoate ("Perbutyl O"; Nippon Nyukazai Co., Ltd., Japan) was added dropwise over 3 hours through the dropping funnel, followed by maintaining the reactor at 110° C. for 15 hours. Then, after cooling to 90° C., the reactor was charged with 0.1 parts by mass of methoquinone and 66 parts by mass of acrylic acid, followed by addition of 5 parts by mass of triphenylphosphine. The reactor was further heated to 100° C. and maintained for 8 hours to obtain a methyl isobutyl ketone solution of an acryl polymer (X) in an amount of 1000 parts by mass (nonvolatile content: 50.0%).

20 parts by mass of this methyl isobutyl ketone solution of the acryl polymer (the acryl polymer accounts for 10.0 parts by mass in 20 parts by mass) was mixed with 45 parts by mass of dipentaerythritol hexaacrylate, 45 parts by mass of fine silica particles having a primary average particle size of 12 nm and having (meth)acryloyl groups on the particle surface ("Aerosil R7200"; Nippon Aerosil Co., Ltd., Japan), 80 parts by mass of methyl isobutyl ketone and 10 parts by mass of propylene glycol monomethyl ether to give a slurry with a nonvolatile content of 50%, which was then mixed and dispersed with a homogenizer to obtain an organic-inorganic hybrid major component composition.

Using this composition, the same procedure as shown in Example 2 was repeated to form a cured product on the surface of a polycarbonate film.

The coating film thickness was found to be 40 μm. There was no occurrence of flaws before and after steel wool abrasion, and the haze value also remained unchanged. It should be noted that the surface pencil hardness was found to be HB. However, many cracks developed upon wrapping around a 40 mm φ metal roll.

Comparative Example 5

The same procedure as shown in Example 1 was repeated, except that no curable resin composition was applied. Many flaws developed after steel wool abrasion, and the change in the haze value was 40%.

Comparative Example 6

The same procedure as shown in Example 2 was repeated, except that no curable resin composition was applied. Many flaws developed after steel wool abrasion, and the change in the haze value was 40%.

The results of these examples and comparative examples are summarized in Table 1. As can be seen from Examples 1 and 3, as well as Comparative Examples 1 and 2, it is indicated that the curable resin composition of the present invention prevents the development of cracks caused by shrinkage on curing.

Upon comparison of Examples 2 and 4 with Comparative Example 3, particularly upon comparison of Example 4 with Comparative Example 3, it is indicated that norbornane diisocyanate and tricyclodecane dimethanol, which is a diol having a fused ring, achieve higher mar resistance against abrasion when used separately, rather than when they are made into a single urethane acrylate.

Upon comparison of Examples 2 and 4 with Comparative Example 4, it is indicated that when compared to the organic-inorganic hybrid composition, the curable resin composition of the present invention has improved mar resistance and surface pencil hardness, and also prevents crack development upon bending, etc.

| | Major components of resin composition | | | | | | | |
|---|---|---|---|---|---|---|---|---|
| | Urethane (meth)acrylate (Component (A))/ parts by mass | (Meth)acrylate monomer (Component (B))/parts by mass | Compound (C) having (meth)acryloyl groups/ parts by mass | Substrate | Film thickness | Change in haze value | Pencil hardness | 40 mm φ bending test |
| Example 1 | 100 | 20 | 0 | PET | 40 mm | 0.20% | 8H | No crack |
| Example 2 | 100 | 20 | 0 | PC | 40 mm | 0.20% | 6H | No crack |
| Example 3 | 112.5 | 20 | 90 | PET | 40 mm | 0.00% | 9H | No crack |
| Example 4 | 112.5 | 20 | 90 | PC | 40 mm | 0.00% | 7H | No crack |
| Comparative Example 1 | 100 | 0 | 0 | PET | Cracks developed immediately after curing Evaluation was given up | | | |
| Comparative Example 2 | 50 | 0 | 50 | PET | Cracks developed immediately after curing Evaluation was given up | | | |
| Comparative Example 3 | | *1 | | PC | 40 mm | 1.00% | 8H | No crack |
| Comparative Example 4 | | *2 | | PC | 40 mm | 0.00% | HB | |
| Comparative Example 5 | 0 | 0 | 0 | PET | — | 40% | F | No crack |
| Comparative Example 6 | 0 | 0 | 0 | PC | — | 40% | 2B | No crack |

*1 100 parts by mass of norbornene diisocyanate (a1), 271.2 parts by mass of a mixture consisting of pentaerythritol triacrylate (a2) and pentaerythritol tetraacrylate (a2), and 47.5 parts by mass of tricyclodecane dimethanol (b1).
*2 10.0 parts by mass of an acryl polymer, 45 parts by mass of dipentaerythritol hexaacrylate, and 45 parts by mass of fine silica particles.

The invention claimed is:

1. A curable resin composition comprising:
   urethane (meth)acrylate (A) which is a reaction product between norbornane diisocyanate (a1) and a compound (a2) having one hydroxyl group and at least one or more (meth)acryloyl groups in a single molecule; and
   a (meth)acrylate monomer (B) which is a reaction product between a polyol having a fused polycyclic structure (b1) and (meth)acrylic acid (b2),
   wherein the polyol having a fused polycyclic structure (b1) comprises at least tricyclodecane dimethanol,
   wherein the curable resin composition comprises 20 to 90 parts by mass of the urethane (meth)acrylate (A) and 10 to 35 parts by mass of the (meth)acrylate monomer (B), relative to 100 parts by mass of the curable resin composition, and
   wherein the curable resin composition further comprises a UV absorber (E), wherein the UV absorber (E) is contained in an amount of 0.1 to 10 parts by mass, relative to 100 parts by mass of the curable resin composition except for the UV absorber (E).

2. The curable resin composition according to claim 1, wherein the compound (a2) is a compound having one hydroxyl group and three to five (meth)acryloyl groups in a single molecule.

3. The curable resin composition according to claim 1, wherein the polyol having a fused polycyclic structure (b1) is a cycloaliphatic polyol having a fused polycyclic structure.

4. The curable resin composition according to claim 1, wherein the polyol having a fused polycyclic structure (b1) is tricyclodecane dimethanol.

5. The curable resin composition according to claim 1, which comprises 20 to 80 parts by mass of the urethane (meth)acrylate (A) and 15 to 30 parts by mass of the (meth)acrylate monomer (B), relative to 100 parts by mass of the curable resin composition.

6. The curable resin composition according to claim 1, which further comprises a compound (C) having at least three or more (meth)acryloyl groups in a single molecule.

7. The curable resin composition according to claim 6, wherein the compound (C) is a reaction product between dipentaerythritol and (meth)acrylic acid and has at least five or more (meth)acryloyl groups.

8. The curable resin composition according to claim 1, which further comprises a photopolymerization initiator (D), wherein the photopolymerization initiator (D) is contained in an amount of 1 to 10 parts by mass, relative to 100 parts by mass of the curable resin composition except for the photopolymerization initiator (D).

9. A cured product obtained by irradiating the curable resin composition according to claim 1 with active energy rays.

10. The cured product according to claim 9, wherein the active energy rays are ultraviolet rays.

11. A laminate obtained by molding the cured product according to claim 9 on a substrate.

12. The laminate according to claim 11, wherein the cured product has a thickness of 5 to 200 μm.

13. The laminate according to claim 11, wherein the substrate is made of a thermoplastic resin.

14. The laminate according to claim 13, wherein the thermoplastic resin comprises at least one of polycarbonate, polyethylene terephthalate and polymethyl methacrylate.

15. A laminate obtained by applying the curable resin composition according to claim 1 onto a resin substrate, followed by irradiation with active energy rays.

16. A curable resin composition comprising:
   urethane (meth)acrylate (A) which is a reaction product between norbornane diisocyanate (a1) and a compound (a2) having one hydroxyl group and at least one or more (meth)acryloyl groups in a single molecule;
   a (meth)acrylate monomer (B) which is a reaction product between a polyol having a fused polycyclic structure (b1) and (meth)acrylic acid (b2), wherein the polyol having a fused polycyclic structure (b1) comprises at least tricyclodecane dimethanol, and
   a compound (C) having at least three or more (meth) acryloyl groups in a single molecule,
   wherein the curable resin composition comprises 20 to 90 parts by mass of the urethane (meth)acrylate (A) and 10 to 35 parts by mass of the (meth)acrylate monomer (B), relative to 100 parts by mass of the curable resin composition.

* * * * *